March 1, 1960     W. HAMILTON     2,926,798

VEHICLE WITH ELEVATING PLATFORM

Filed Feb. 19, 1958     4 Sheets-Sheet 1

INVENTOR.
WALLACE HAMILTON
BY
*ATTORNEY*

March 1, 1960  W. HAMILTON  2,926,798
VEHICLE WITH ELEVATING PLATFORM
Filed Feb. 19, 1958  4 Sheets-Sheet 2

INVENTOR.
WALLACE HAMILTON
BY
ATTORNEY

March 1, 1960 W. HAMILTON 2,926,798
VEHICLE WITH ELEVATING PLATFORM
Filed Feb. 19, 1958 4 Sheets-Sheet 4

INVENTOR.
WALLACE HAMILTON
BY
ATTORNEY

United States Patent Office 2,926,798
Patented Mar. 1, 1960

2,926,798

VEHICLE WITH ELEVATING PLATFORM

Wallace Hamilton, Bentleyville, Ohio, assignor to Cleveland Pneumatic Industries, Inc., Cleveland, Ohio, a corporation of Ohio Application February 19, 1958, Serial No. 716,223

7 Claims. (Cl. 214—130)

This invention relates generally to ground vehicles and more particularly to a vehicle adapted for use in the ground handling of missiles and the like.

It is an important object of this invention to provide a ground handling vehicle suitable for transporting missiles from one location to another and, in addition, providing a launching platform.

It is another important object of this invention to provide a vehicle for the ground handling of missiles incorporating a launching platform which can be elevated for missile firing.

It is another important object of this invention to provide a vehicle with a load supporting platform which can be supported either on the vehicle or on its own elevating structure.

It is another important object of this invention to provide a wheeled vehicle including a load platform in combination with means for elevating the platform and lifting the load thereon off of the wheels.

Further objects and advantages will appear from the following description and drawings wherein.

Figure 1:
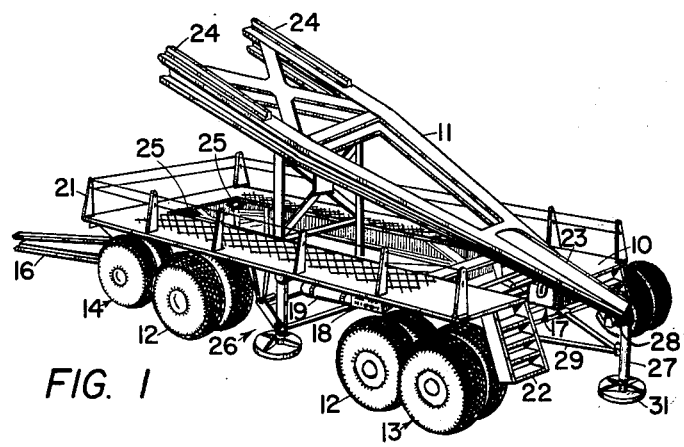
Figure 1 is a perspective view of the preferred missile handling ground vehicle incorporating this invention.
Figure 2:
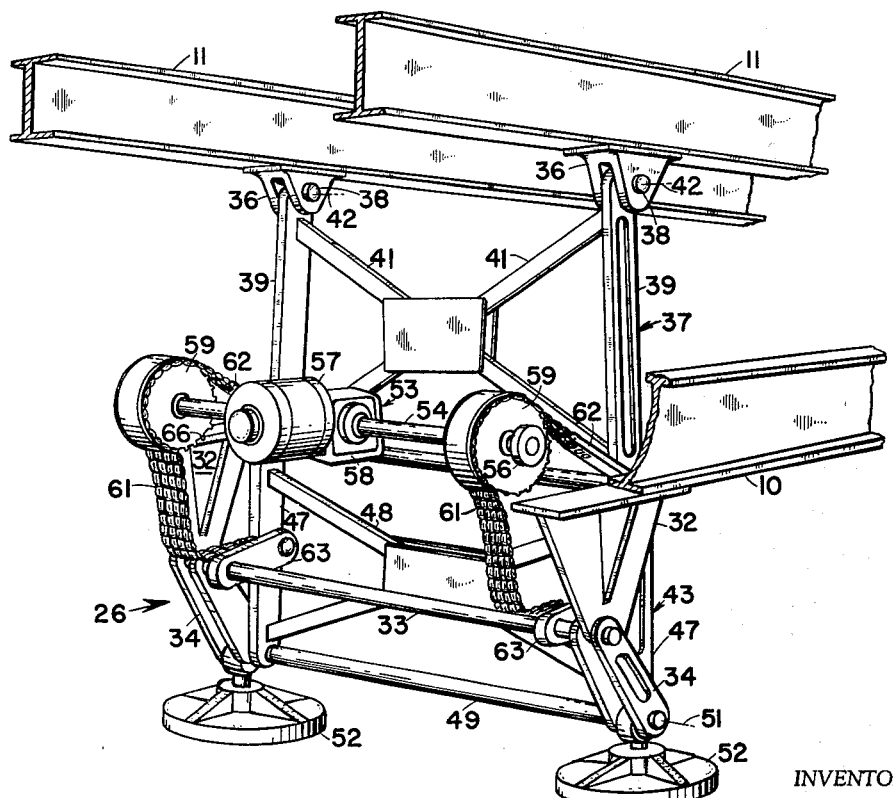
Figure 2 is an enlarged fragmentary view of the platform raising mechanism with parts broken away for purposes of illustration.

The missile handling vehicle according to this invention includes a vehicle frame 10 and a load platform 11. The frame 10 is carried by wheels 12 in the conventional manner and is shown as in the form of a trailer which can be towed by any suitable tractor or the like. In the particular embodiment shown, the rear wheels are journalled on a rear truck 13 in a dual tandem arrangement and the front wheels on a front truck 14 are also in a dual tandem arrangement. A tow-bar 16 is connected to the front truck 14 and is used to steer and tow the vehicle. The load platform 11 is connected near its rearward end, shown generally at 17, to the rearward end of the frame 10 by a connection which prevents axial motion between the platform 11 and frame 10 while permitting limited relative vertical movement, and is rotatable around the connection between a raised position shown in Figure 1 and a horizontal position wherein the load platform 11 lies along the frame 10. In addition, the various accessory equipment such as control panels 18, pressure tanks 19, railings 21 and steps 22 are mounted on the frame 10 in convenient locations. It should be understood that this accessory equipment is shown only to illustrate the environment for the invention, and is not critical thereto.

The load platform 11 shown in Figure 1 is typical of a structure utilized for the support and launching of a missile. In this case the load platform is formed of beams which are welded together to form an elongated platform having a rearward guide rail 23 and forward guide rails 24. The missile or any other load, which is to be carried by the vehicle, would normally be supported by these guide rails during transit and be launched therefrom when the missile is fired. The load platform 11 is carried by the frame 10 when it is in the lowered position and preferably is supported at the forward end on pads 25 which engage the frame 10 over the forward truck 14 and by the connection 17 over the rearward truck 13. This arrangement is preferable since it eliminates bending loads on the frame and makes it possible to use a lighter frame structure.

Figure 6:
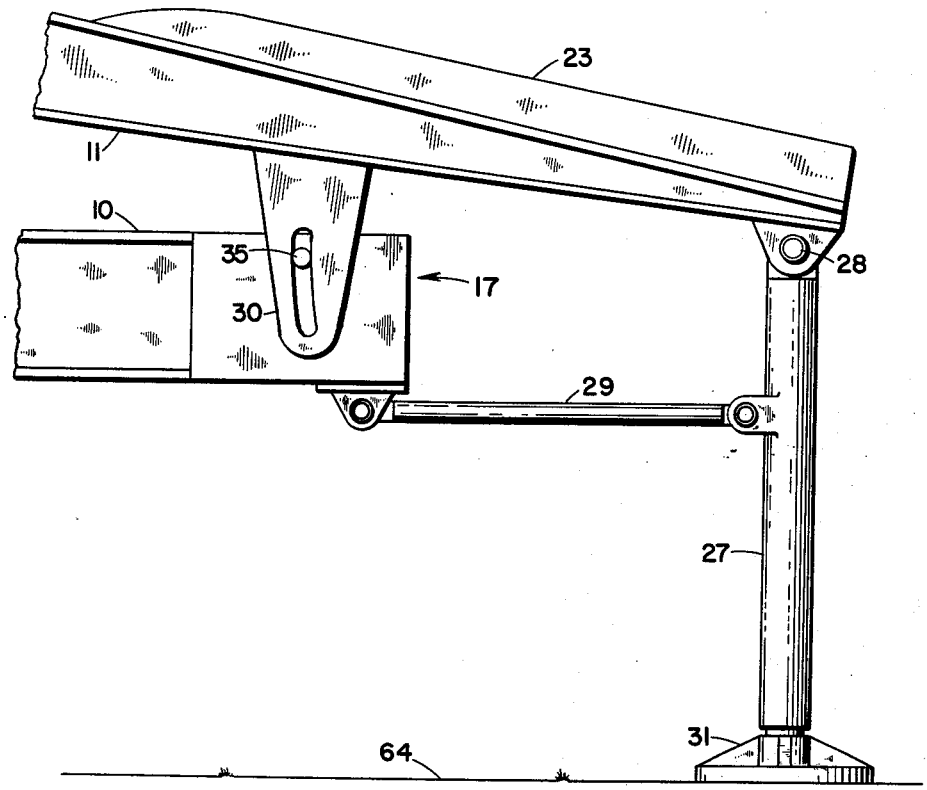
Figure 6 is an enlarged fragmentary view of the connection between the frame and load platform and the mounting of the rear strut.

To elevate the load platform 11 to the position shown in Figure 1, I utilize an elevating mechanism shown generally at 26 which can be operated to move the load platform between the lowered and elevated positions. In order to provide the stability and rigidity necessary for missile launching, it is desirable to arrange the elevating mechanism 26 so that the load platform is supported directly on the ground when the load platform is elevated. To support the rearward end of the load platform I provide a strut 27 pivotally connected at 28 to the rearward end of the load platform 11 and laterally supported by tie bars 29 connected between the strut 27 and the frame 10. A ground engaging pad 31 is mounted on the lower end of the strut 27 and is adapted to engage the ground and support the load platform when it is in the elevated position. It is not necessary to provide power means to control the strut 27, since the connection at 17 is spaced forward from the strut 27 so that the movement of the load platform to the elevated position lowers the strut 27 until the pad 31 engages the ground. Once the rearward end of the platform 11 is supported by the strut 27, any additional elevation of the platform will cause the platform to rotate about the pivot 28. For this reason the connection at 17 should permit relative vertical movement between the platform 11 and the frame 10, even though it prevents relative axial motion. One type of connection 17 is shown in Figure 6 wherein the frame 10 is provided with a bar 35 which extends through a slotted plate 30 mounted on the platform 11. When the strut 27 is not carrying the weight of the rearward end of the platform, the bar 35 engages the top of the slot and acts as a pivot connection. However, when the load is assumed by the strut 27, the bar 35 moves down along the slot 30 permitting relative vertical movement between the platform 11 and the frame 10.

Reference should now be made to Figures 2 through 5 for a clear understanding of the elevating mechanism 26 wherein some parts have been removed to simplify the illustration of this invention. The frame 10 is provided with lateraly spaced depending projections 32 which extend downwardly from the beams of the frame 10 and provide a mount for a cross-shaft 33. The cross-shaft 33 is journalled for rotation about its longitudinal axis on the projections 32 and, adjacent to the outer ends thereof, is provided with similar links 34 which are keyed to the cross-shaft 33 for rotation therewith. Mounted on the load platform 11 are bearings 36 on which is pivoted an upper elevating frame 37 by coaxial pivot pins 38. The upper elevating frame 37 includes two parallel side braces or links 39 connected by cross-bars 41 to form a rigid structure, so that the upper elevating frame 37 is rotatable as a unit relative to the load platform 11 around the axis 42 of the pivot pins 38. A lower elevating frame 43 is pivotally connected to the upper elevating frame 37 by pivot pins 44 so that the two frames are rotatable relative to each other about a pivot axis 46. Here again the lower elevating frame is formed of side braces or links 47 connected by cross-braces 48 to form a rigid frame structure. A lower cross-bar 49 extends through the lower ends of the links 34 and the lower ends of the side braces 47, so that the links 34 and the side braces 47 are pivotally connected for relative rotation around a pivot axis 51. Also mounted on the lower cross-bar 49 are spaced ground engaging pads 52 which are adapted to engage the ground and support the forward end of the load platform 11 when it is elevated.

To complete the elevating mechanism 26, I provide a power unit 53 which is mounted on the frame 10. The power unit includes a drive shaft 54 journalled on bearings 56 which are, in turn, mounted on the frame 10, a rotary motor 57 which can be electric, hydraulic or pneumatic, and a reducing gear box 58 connecting the motor 57 and the drive shaft 54. Keyed to the drive shaft 54 adjacent to its opposite ends are sprocket wheels 59 which are rotated with the drive shaft 54 by the motor 57 and the gear box 58. Similar connecting chains 61 extend over the sprocket wheels 59 and are connected to the linkage. One end of each chain 61 is connected to one of the pivot pins 44 by a bar 62, and the other end of each chain 61 is connected to a rocker arm 63 keyed to the cross-shaft 33.

Figure 3:
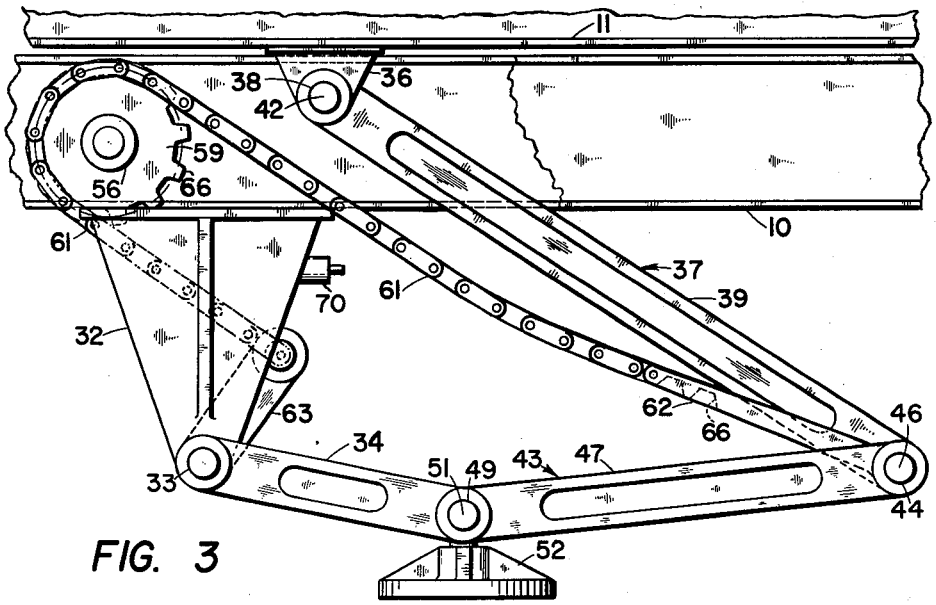
Figure 3 is a schematic side elevation of the platform elevating mechanism in the position the elements assume when the vehicle is moved along the ground.
Figure 4:
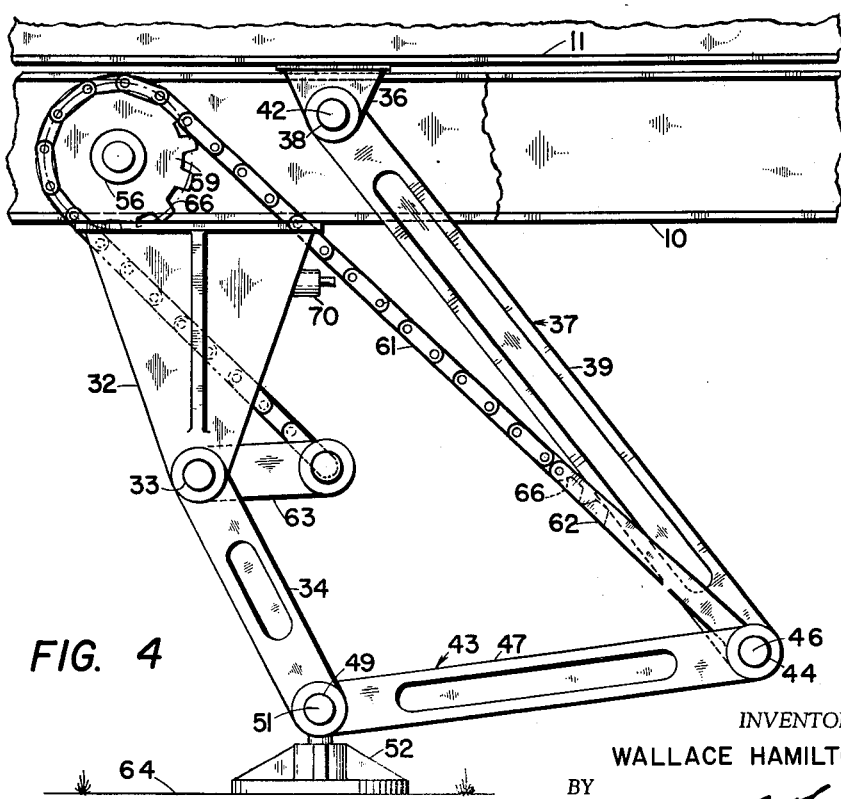
Figure 4 is a view similar to Figure 3 showing the position the elements assume when the ground engaging pad is on the ground prior to the elevating of the load platform.
Figure 5:
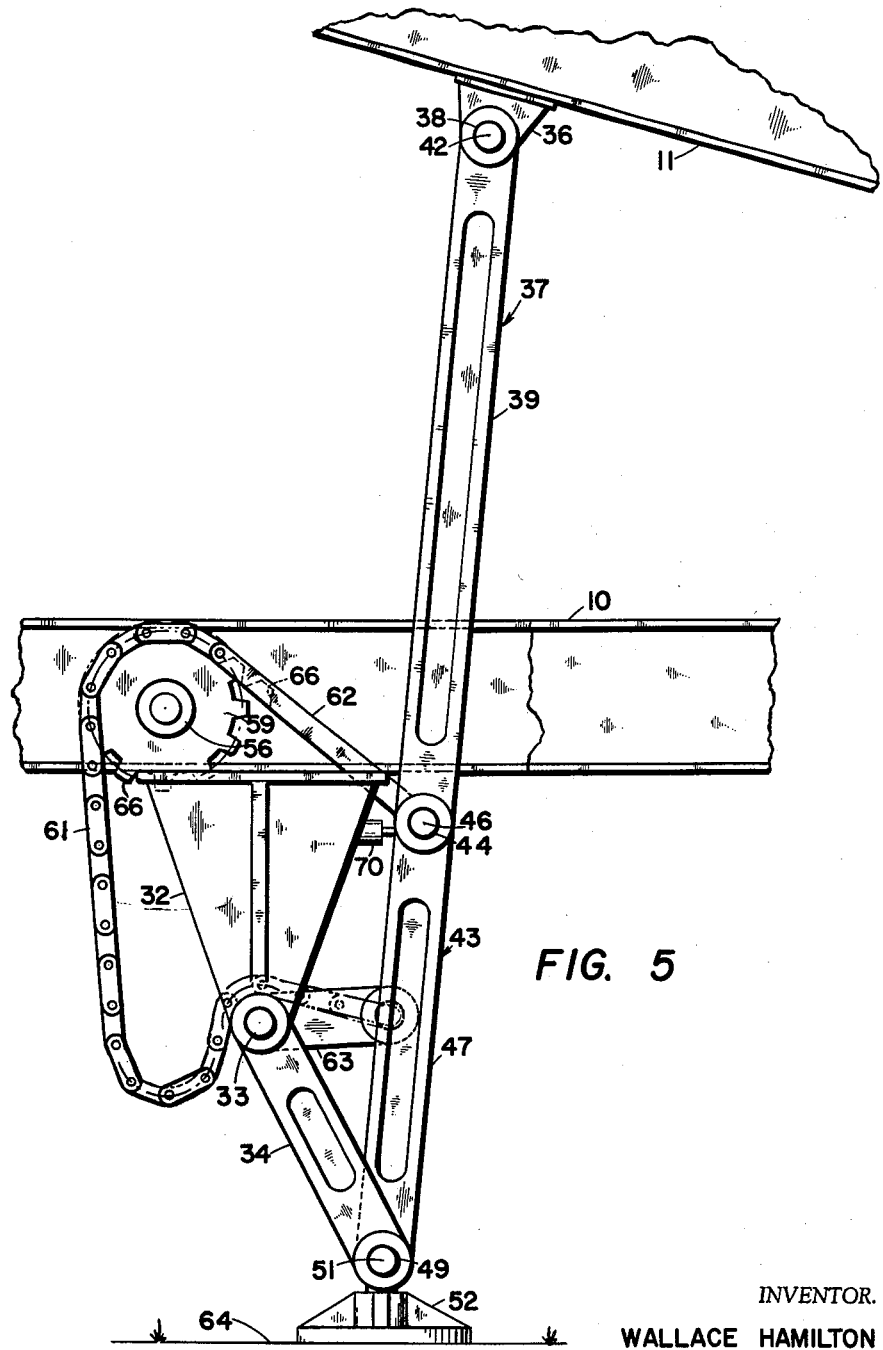
Figure 5 is a view similar to Figures 3 and 4 showing the positions the elements assume when the load platform is elevated.

Referring now to Figures 3 through 5, when the load platform is in the lowered position, it extends along the frame 10 and is supported thereby. At this time the sprocket wheels 59, through the connection of the chains 61 and the rocker arms 63, hold the links 34 in a raised position so that the ground engaging pads 52 are clear of the ground. When it is desired to elevate the load platform 11, it is merely necessary to energize the rotary motor 57 to rotate the sprocket wheels 59 into a counter-clockwise direction. This causes the chains 61 to pass over the sprocket wheels 59 and permit the rocker arms 63 to rotate due to their weight in a clockwise direction, lowering the links 34 until the ground engaging pads 52 move into engagement with the ground 64 which is the position shown in Figure 4. As the sprocket wheels 59 continue to rotate in a counter-clockwise direction, the chains 61 through the bars 62 pull the pivot pins 44 toward the sprocket wheels 59 causing the lower elevating frame 43 to rotate in a counter-clockwise direction around the axis 51 of the cross-bar 49. At the same time the upper elevating frame 37 is caused to rotate in a clockwise direction around the axis 42 of the pivot pins 38. The load platform 11 cannot move longitudinally along the frame 10 because of its connection thereto at 17, so it can merely move upward along an arc having its center at the connection 17. As the sprocket wheels 59 continue to rotate, the upper elevating frame 37 and the lower elevating frame 43 move toward a position of alignment shown in Figure 5, causing the load platform 11 to be raised away from the frame 10 to the elevated position of Figure 5. The various elements should be proportioned so that the two elevating frames 37 and 43 are in substantial alignment when the load platform 11 is in the raised or elevated position, so that there will be substantially no loads on the power unit. The bars 62 should be formed with teeth 66 at their upper end which engage the teeth of the sprocket wheels 59, so that there is a rigid connection between the sprocket wheels 59 and the pivot pin 44 when the elements are in the elevated position. Therefore, any tendency of the elevating frames 37 and 43 to pass over the center is prevented, and also when the mechanism is to be returned to the lowered position, the sprocket wheels 59 can exert a force on the bar 62 to move the pivot pin 44 to the right out of the aligned position. It should be noted that when the elements are in the elevated position of Figure 5, the chain 61 on the left side of the sprocket wheel 59 drapes down loosely over the cross-shaft 33. If desired, a stop switch 70 can be arranged to be engaged by the elevating frame 43 and de-energize the motor 57 when the two frames 37 and 43 reach an aligned position. Because the bars 62 provide a rigid connection between the sprocket wheels 59 and the pivot pins 44 when the teeth of the bars engage the sprocket wheels, the mechanism is locked in the upper position.

When it is desired to lower the load platform 11, it is merely necessary to energize the motor 57 in a direction which will cause the sprocket wheels 59 to rotate in a clockwise direction. This will cause the bars 62 to push on the pivot pins 44 and move the two elevating frames 37 and 43 out of alignment. Once the two elevating frames are out of alignment, the weight of the load platform will cause the elevating frames 37 and 43 to fold, and, therefore, place the chains 61 in tension. By merely controlling the speed of the sprocket wheels 59, it is possible to control the rate of lowering the load platform. The reduction gear box 58 should be arranged so that it cannot be motored from the output end, so the rate of lowering will be determined by the speed of the motor 57.

Those skilled in the art will recognize that the use of a simple link type structure of the type disclosed eliminates the complexity of slide bearings and the like. Also, such a simple link type structure is relatively immune to wear and provides a long trouble-free service life. It should be noted that the lifting forces of the elevating mechanism 26 are carried completely by the ground engaging pads 52, and are not transmitted through the wheels 12 once the load is assumed by the elevating mechanism. As mentioned previously, the elevating movement of the load platform 11 causes the ground engaging pad 31 to assume the load of the rearward end of the elevating platform 11, so the entire mechanism is carried on a tripod-like structure when it is elevated.

Because the frame 10 is not subjected to the elevating load and because the load platform 11 rests on the frame over the wheels 12 when it is in the lowered position, it is not necessary to provide a heavy frame 10. It is merely necessary to provide sufficient strength to connect the rearward and forward trucks 13 and 14 respectively, and provide strength for the associated equipment. In other words, the disclosed structure permits the use of a lightweight frame for the vehicle, reducing the overall weight of the unit to the minimum.

Although the preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed descriptions are determinative of the scope of the invention.

I claim:

1. A vehicle adapted to roll along the ground comprising a frame supported on ground engaging wheels, a load platform, a connection between said frame and platform permitting tilting movement of said platform between an elevated position and a lowered position and preventing horizontal movement between said frame and platform, a first link pivoted on said frame for rotation relative thereto about a first axis, a pad connected to said first link at a point spaced from said axis, collapsing jack means including a first element pivotally connected at a first point to said platform and a second element pivotally connected at a second point to said first link, said elements being connected for relative movement between a collapsed position wherein said first and second points are spaced apart a minimum distance and an extended position wherein said first and second points are spaced apart a maximum distance, movement of said elements from said collapsed position to said extended position moving said pad into engagement with the ground and thereafter raising said platform to said tilted position.

2. A vehicle adapted to roll along the ground comprising a frame supported on ground engaging wheels, a load platform, a connection between said frame and platform permitting tilting movement of said platform between an elevated position and a lowered position and preventing horizontal movement between said frame and platform, a first link pivoted on said frame for rotation relative thereto about a first axis, a pad connected to said first link at a point spaced from said axis, collapsing jack means including a first element pivotally connected at a first point to said platform and a second element pivotally connected at a second point to said first link, said elements being connected for relative movement between a collapsed position wherein said first and second points are spaced apart a minimum distance and an extended position wherein said first and second points are spaced apart a maximum distance, and power means connected to said jack means operable to move said elements between said collapsed position to said extended position, movement of said elements from said collapsed position to said extended position moving said pad into engagement with the ground and thereafter raising said platform to said tilted position.

3. A vehicle adapted to roll along the ground comprising a frame supported on ground engaging wheels, a load platform, a connection between said frame and platform permitting vertical movement of said platform between an elevated position and a lowered position and preventing horizontal movement between said frame and platform, a first link pivoted on said frame for rotation relative thereto about a first axis, a pad connected to said first link at a point spaced from said axis, collapsing jack means including a first element pivotally connected at a first point to said platform and a second element pivotally connected at a second point to said first link, said elements being connected for relative movement between a collapsed position wherein said first and second points are spaced apart a minimum distance and an extended position wherein said first and second points are spaced apart a maximum distance, and a strut connected to said platform moved into engagement with the ground by movement of said platform to said elevated position.

4. A ground vehicle comprising an elongated frame, wheels journalled on said frame, an elongated elevating platform connected to said frame for movement between a raised position and a lowered position, a first link pivoted at one end on said frame, a second link pivoted at one end on said platform, a third link pivotally connected between the other ends of said first and second links, a ground engaging element on one of said links, said second and third links being substantially aligned when said platform is in said raised position with said ground engaging elements supporting said platform, and power means connected to said links operable to move them into alignment.

5. A vehicle comprising an elongated frame, wheels journalled on said frame, an elongated elevating platform connected to said frame for movement between a raised position and a lowered position, a first link pivoted at one end on said frame, a second link pivoted at one end on said platform, a third link pivotally connected between the other ends of said first and second links, a ground engaging element on one of said links, said second and third links being substantially aligned when said platform is in said raised position with said ground engaging elements supporting said platform, and said second and third links being folded about their pivotal connection when said platform is in said lowered position with said ground engaging elements spaced from the ground, and power means connected to said links operable to move them into alignment.

6. A ground vehicle comprising a wheel supported frame, a platform axially fixed relative to said frame at one point and tiltable between a lowered position wherein said frame supports said platform and an elevated position, a first link having one end pivoted on said frame for rotation about a first axis and a pad on the other end, second and third links pivotally connected together for relative rotation about a second axis, end connections between said second link and said platform and between said third link and said first link, power means mounted on said frame, and power transmitting means connected between said power means and links operable under the influence of said power means to rotate said second and third links into an aligned position thereby moving said pad into engagement with the ground and said platform to said elevated position.

7. A ground vehicle comprising a wheel supported frame, a platform axially fixed relative to said frame at one point and tiltable between a lowered position wherein said frame supports said platform and an elevated position, a first link having one end pivoted on said frame for rotation about a first axis and a pad on the other end, second and third links pivotally connected together for relative rotation about a second axis, end connections between said second link and said platform and between said third link and said first link, power means mounted on said frame, power transmitting means connected between said power means and links operable under the influence of said power means to rotate said second and third links into an aligned position thereby moving said pad into engagement with the ground and said platform to said elevated position, and a strut on said platform moved into engagement with the ground by movement of said platform to said elevated position cooperating with said links to support the weight of said platform when the latter is in said elevated position.

References Cited in the file of this patent

UNITED STATES PATENTS

| 2,364,365 | Hultquist | Dec. 5, 1944 |
| 2,465,244 | Lutz | Mar. 22, 1949 |
| 2,493,877 | Jacobs et al. | Jan. 10, 1950 |
| 2,729,406 | Bush | Jan. 3, 1956 |
| 2,741,373 | Edgar | Apr. 10, 1956 |
| 2,745,566 | Bouffard | May 15, 1956 |

FOREIGN PATENTS

| 183,017 | Austria | Aug. 25, 1925 |
| 1,009,822 | France | Mar. 12, 1952 |